No. 697,233. Patented Apr. 8, 1902.
J. CHAGNOT.
ANIMAL TRAP.
(Application filed Jan. 16, 1902.)
(No Model.)
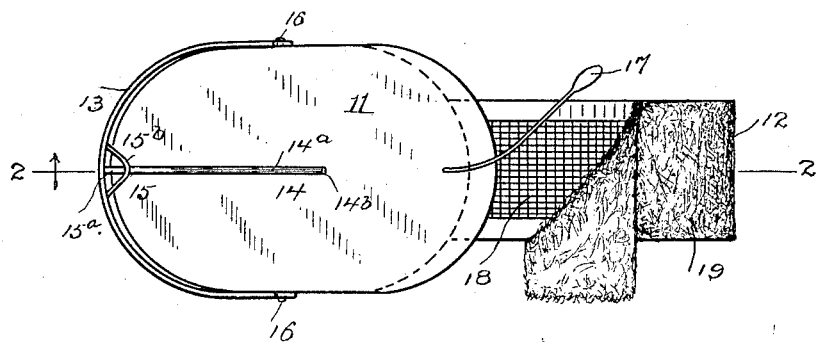
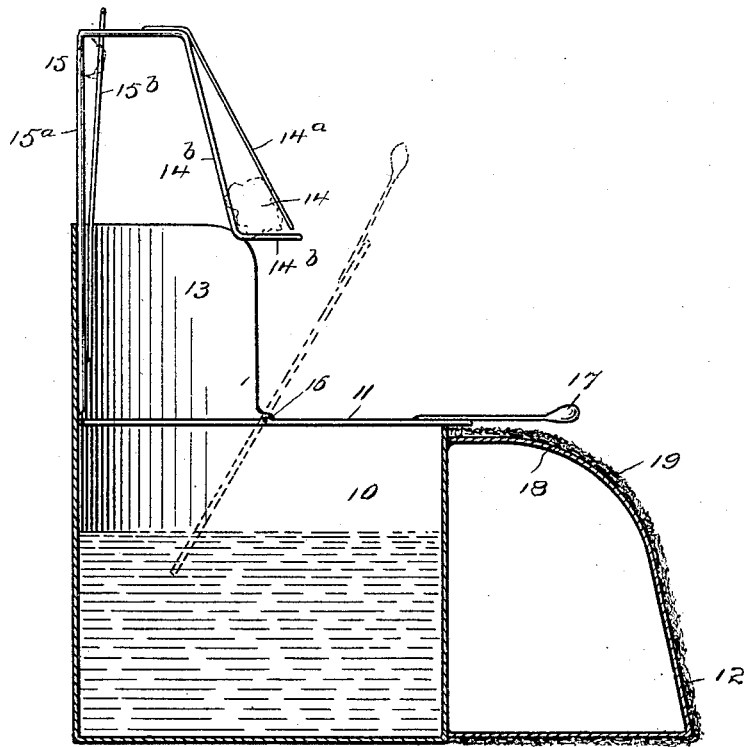
WITNESSES.    INVENTOR.

UNITED STATES PATENT OFFICE.

JOSEPH CHAGNOT, OF TORRINGTON, CONNECTICUT.

ANIMAL-TRAP.

SPECIFICATION forming part of Letters Patent No. 697,233, dated April 8, 1902.

Application filed January 16, 1902. Serial No. 89,975. (No model.)

*To all whom it may concern:*

Be it known that I, JOSEPH CHAGNOT, a citizen of the United States, residing at Torrington, county of Litchfield, State of Connecticut, have invented a new and useful Animal-Trap, of which the following is a specification.

My invention has for its object to provide a simple and inexpensive self-setting animal-trap that will catch a large number of mice, rats, or other animals, will drown them as fast as they are caught, and shall be cleanly and easy to care for.

With these ends in view I have devised the simple and novel trap which I will now describe, referring to the accompanying drawings, forming part of this specification, and using reference characters to designate the several parts.

Figure 1 is a plan view of my novel trap, and Fig. 2 is a section on the line 2 2 in Fig. 1.

My novel trap comprises a reservoir 10, a tilting platform 11, covering the reservoir, a runway 12, a guard 13, and primary and secondary bait-holders, (designated, respectively, by 14 and 15.) The reservoir may be made of any suitable shape or size, depending upon the special use for which the trap is intended, my novel trap being equally adapted for catching different kinds of animals—as, for example, mice, rats, rabbits, muskrats, &c.—different-sized traps being of course provided for different uses. For the smaller sizes the reservoir may be made of ordinary tin-plate and is preferably made oval in horizontal section, as indicated in the drawing.

In practice the reservoir is filled two-thirds full, more or less, of water. The tilting platform is pivoted to the top of the reservoir on opposite sides, as at 16, and may be so pivoted as to be self-retaining in the set position by placing the pivotal points slightly forward of its mid-length or by providing it with a counterweight 17, or both, as preferred. The runway may be made more or less inclined, as preferred, and leads up to the tilting platform in such a manner as to make the latter easy of access. The runway may be made of any suitable material, but is preferably covered with a strip of wire-netting 18, and over the wire-netting is placed a strip of felt 19. I have found in practice that the use of the wire-netting and felt together give an excellent foothold and permit animals to mount to the platform easily. The guard extends upward from the back of the reservoir and forward to the pivotal points of the platform, so that when the platform tilts the animal will slide forward against the guard and cannot help being precipitated into the reservoir. At a convenient point of access and approximately over the pivotal point of the tilting platform I place the primary bait-holder 14. The construction of this bait-holder may be varied to suit the special requirements of use. In the drawings I have illustrated a primary bait-holder 14, comprising a spring-arm $14^a$, on which the bait is impaled and by which it is held against an L-shaped arm $14^b$. This bait may, if preferred, be partially inclosed or may be a hard material that will tempt the animal, but be difficult of removal. Back of the primary bait-holder and at some distance above it I place the secondary bait-holder 15, which may comprise an arm $15^a$, which in the present instance is made integral with L-shaped arm $14^b$, and a spring-arm $15^b$, between which the bait is clamped and held firmly.

In use the animal finding it difficult to get the bait from the primary bait-holder will move forward and attempt to get it from the secondary bait-holder. In doing so he will pass beyond the pivotal point of the tilting platform and his weight will cause it to tilt, as indicated by dotted lines in Fig. 2, and will precipitate him into the reservoir, the platform immediately resuming its operative or set position and the animal that has been caught being wholly concealed from view within the reservoir and being quickly drowned therein.

As the secondary bait is not likely to be injured in use, it follows that a number of animals may be caught and drowned without the trap requiring the slightest attention, and that it is always set and ready for use except at the instant the platform is tilted to throw an animal into the reservoir.

Having thus described my invention, I claim—

1. A trap comprising a reservoir, a tilting platform covering the reservoir, a guard, a bait-holder and a runway leading to the platform, the surface of said runway being covered first with wire-netting and then with felt.

2. A trap comprising a reservoir, a tilting platform covering the reservoir, a guard at the back of the platform, a runway leading to the platform, a primary bait-holder and a secondary bait-holder back of and above the primary bait-holder so that an animal in attempting to reach it will tilt the platform and be thrown into the reservoir.

In testimony whereof I affix my signature in presence of two witnesses.

JOSEPH CHAGNOT.

Witnesses:
WILLIAM W. BIERCE,
MARTIN R. ROOD.